United States Patent

Strehle

[15] 3,641,892
[45] Feb. 15, 1972

[54] OBJECTIVE LENS ADAPTOR

[72] Inventor: Horst Strehle, Dresden, Germany

[73] Assignee: Kombinat VEB Pentacon Dresden Kamera-und Kinowerke

[22] Filed: Aug. 11, 1969

[21] Appl. No.: 849,006

[52] U.S. Cl. .................................................. 95/10 C, 95/64 R
[51] Int. Cl. ......................................... G03b 7/02, G03b 17/14
[58] Field of Search ..................... 95/10 C, 42, 64, 64 B

[56] References Cited

UNITED STATES PATENTS

| | | | |
|---|---|---|---|
| 3,465,661 | 9/1969 | Hahn et al. | 95/10 C X |
| 3,470,805 | 10/1969 | Suzuki et al. | 95/10 C X |
| 3,486,434 | 12/1969 | Suzuki et al. | 95/10 C X |
| 3,495,514 | 2/1970 | Nakamura et al. | 95/10 C |
| 3,498,193 | 3/1970 | Shimomura et al. | 95/10 C |

Primary Examiner—Joseph F. Peters
Attorney—Young & Thompson

[57] ABSTRACT

A photographic camera including a photoelectric measuring device built into its housing having circuit contacts for connection to a variable resistive element is provided with a lens mount. The mount is removably connectable with an objective lens housing and also with the camera housing and enables a suitable objective lens to be connected with the camera housing. The mount includes an electric circuit including a variable resistor moveable by a control member. The control member is adapted for interconnection with a diaphragm aperture setting member position on the housing of a suitable objective lens to permit concomitant movement therewith. The circuit in the mount is provided with circuit contacts positioned for connection with the contacts on the camera housing when the mount is connected.

1 Claims, 1 Drawing Figure

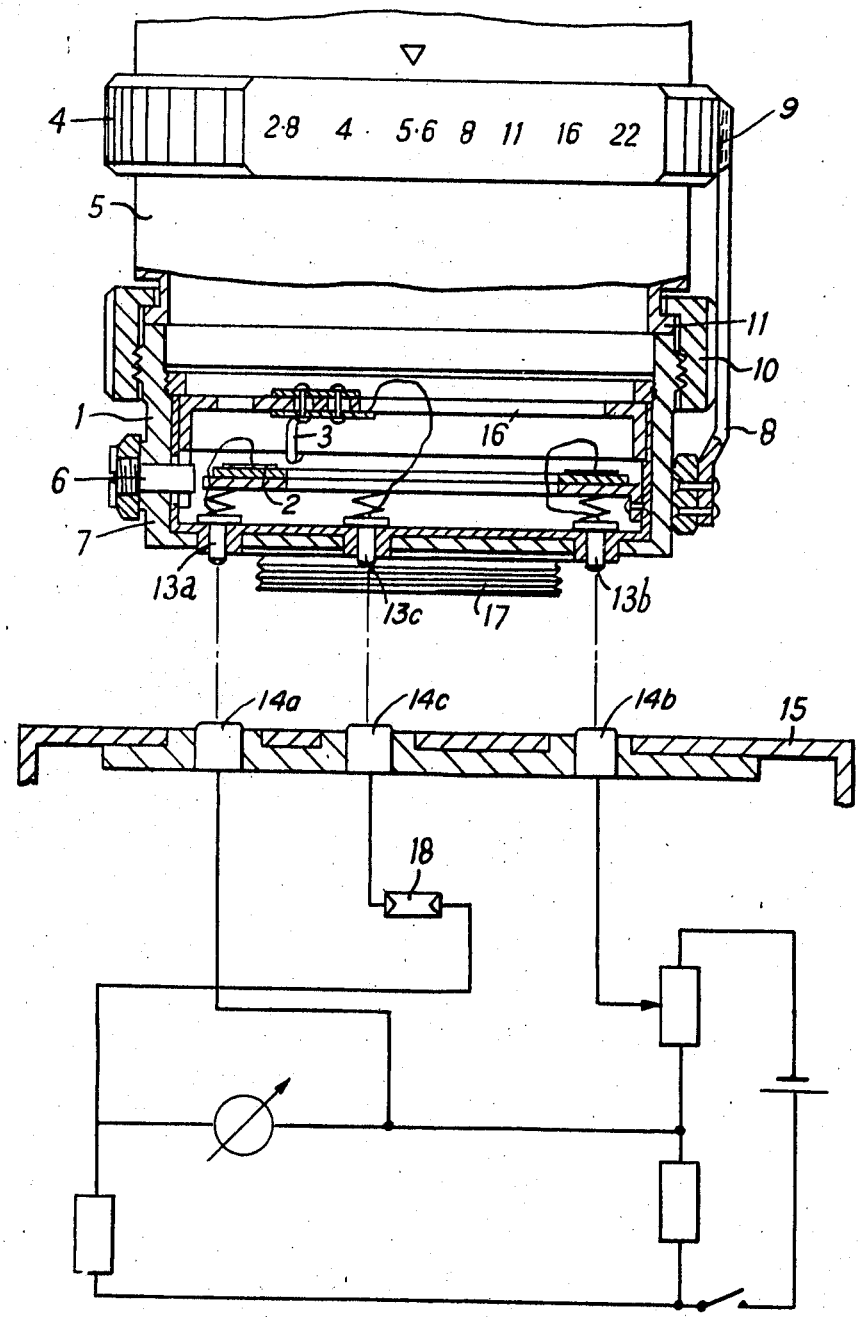

OBJECTIVE LENS ADAPTOR

BACKGROUND TO THE INVENTION

The invention relates to a camera having a lens mount for affixing an interchangeable objective to the camera housing which contains a built-in photoelectric exposure-measuring device, contacts belonging to the said exposure-measuring device and situated in the camera housing being provided, to which a variable resistance adjustable by means of the diaphragm-setting device can be connected.

For the use of a photographic camera of this kind special interchangeable objectives are known which have a built-in variable resistance adjustable with the diaphragm-setting device.

An object of the invention is to make it possible to use conventional interchangeable objectives, i.e., those having no built-in variable resistances, in conjunction with the type of camera mentioned at the beginning, and to provide an additional interchangeable lens mount for this purpose.

SUMMARY OF THE INVENTION

The invention enables this object to be achieved in that the variable resistance which can be connected to the contacts provided on the camera side is built into the lens mount and adjustable by means of an adjusting ring which can be rigidly coupled to the diaphragm-setting device on the objective side.

The invention will be explained by reference to one embodiment of a camera assembly in accordance with the invention.

BRIEF DESCRIPTION OF DRAWINGS

The single drawing shows a partly sectioned elevation of a lens mount for connecting a camera housing to a housing for an objective lens, the lens mount 10 being shown connected to the lens housing but spaced from the camera housing.

DESCRIPTION OF PREFERRED EMBODIMENT

The camera housing illustrated diagrammatically at the lower portion of the figure may be connected to any one of a number of interchangeable objective lens housings, one such housing being shown at 5, the housing 5 houses not only an objective lens but also a diaphragm which may be adjusted by rotating the diaphragm setting device 4 to vary the diaphragm aperture before the commencement of the exposure process. The lens mount 1, which bears a clamp ring 10 with which bayonet lugs 11 of the interchangeable objective lens housing 5 can be connected.

A layer resistance 2, of which both ends are electrically connected with resilient contact pins 13a and 13b, is built into the lens mount 1. The resistor 2 has a sliding contact 3 which is affixed to, and rotatable with a rotatable adjusting ring 16 which is rigidly connected by pins 6 to an operating ring 7 which comprises a control member, the operating ring 7 extending round the periphery of the housing 1. The ring 7 bears a radially resilient coupling arm 8 which can be coupled to a suitably positioned coupling lug 9 of the diaphragm setting device 4. The sliding contact 3 is electrically connected with the resilient contact pin 13c. The lens mount 1 can be affixed to the camera housing 15 by the screw thread 17 provided on the annular housing 1.

The camera housing 15, of which only part is shown in the drawing, contains a light intensity measuring device including a photoelectric cell 18 of a known design and positioned to receive light from the direction of an object to be photographed. The cell 18 is connected with contacts 14a, 14b and 14c situated on the front of the camera housing 15. When the lens mount 1 is attached, the resilient contact pins 13a, 13b and 13c on the mount move into a position in which they touch the contacts 14a, 14b and 14c provided on the camera. In this manner, a circuit part in the camera housing including the photoelectric cell and a circuit part in the lens mount including the variable resistor are connected together to form a circuit. By rotating the diaphragm setting device 4 the layer resistance 2 in the lens mount 1 is varied by the user of the camera until an indicator formed by a galvanometer provided in the diagonal branch of a Wheatstone bridge no longer shows any deflection. At this time the aperture of the diaphragm is correct for the light intensity and a photograph may be taken. Naturally, on each interchangeable lens housing, the connector lug—on the diaphragm setting ring must be located at a suitable predetermined position.

I claim:

1. In a photographic camera having a housing and a photoelectric measuring device built into the housing having circuit contacts mounted on the housing for connection to a variable resistive element, the provision of a lens mount removably connectable to an objective lens housing and to the camera housing to simultaneously connect a suitable objective lens on the camera housing, the mount accommodating a part of an electric circuit including a resistor variable by movement of a control member adapted to be connected for concomitant movement with a diaphragm aperture setting member positioned on the housing of the suitable objective lens, the lens mount being removable from the camera housing simultaneously with the objective lens housing, the circuit in the mount having contacts positioned for connection with the contacts on the camera housing when the mount is connected to the camera housing.

* * * * *